(12) United States Patent
Korcz et al.

(10) Patent No.: US 7,824,213 B1
(45) Date of Patent: Nov. 2, 2010

(54) ONE-PIECE ELECTRICAL CABLE CONNECTOR HAVING A RETAINING SPRING

(75) Inventors: Krzysztof W. Korcz, Granger, IN (US); Mahran H. Ayrton, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 12/509,890

(22) Filed: Jul. 27, 2009

(51) Int. Cl.
*H01R 13/73* (2006.01)
(52) U.S. Cl. .................... 439/552; 174/64; 174/650; 174/655; 174/657; 174/659; 174/660; 174/661
(58) Field of Classification Search ............... 439/552; 174/64, 650, 655, 657, 659, 660, 661
See application file for complete search history.

(56) References Cited

U.S. PATENT DOCUMENTS

| | | | |
|---|---|---|---|
| 4,711,472 A | 12/1987 | Schnell | |
| 4,781,628 A * | 11/1988 | Detter et al. | 439/748 |
| 4,970,350 A | 11/1990 | Harrington | |
| 4,990,721 A * | 2/1991 | Sheehan | 174/660 |
| 5,068,496 A | 11/1991 | Favalora | |
| 5,204,499 A | 4/1993 | Favalora | |
| 5,285,013 A | 2/1994 | Schnell et al. | |
| 5,373,106 A | 12/1994 | O'Neil et al. | |
| 5,422,437 A | 6/1995 | Schnell | |
| 5,731,543 A | 3/1998 | Jorgensen | |
| 6,020,557 A | 2/2000 | Jorgensen | |
| 6,034,326 A | 3/2000 | Jorgensen | |
| 6,080,933 A | 6/2000 | Gretz | |
| 6,114,630 A * | 9/2000 | Gretz | 174/660 |
| 6,177,633 B1 | 1/2001 | Gretz | |
| 6,213,818 B1 * | 4/2001 | Chadbourne | 439/810 |
| 6,444,907 B1 | 9/2002 | Kiely | |
| 6,521,833 B1 | 2/2003 | DeFreitas | |
| 6,682,355 B1 | 1/2004 | Gretz | |
| 6,827,604 B1 | 12/2004 | White | |
| 6,849,803 B1 | 2/2005 | Gretz | |
| 6,872,886 B2 | 3/2005 | Kiely | |
| 6,916,988 B1 | 7/2005 | Auray et al. | |
| 7,057,107 B2 | 6/2006 | Auray et al. | |
| 7,060,900 B1 | 6/2006 | Gretz | |
| 7,064,272 B2 | 6/2006 | Auray et al. | |
| 7,148,431 B2 * | 12/2006 | Pyron | 174/656 |

(Continued)

*Primary Examiner*—Tho D Ta
(74) *Attorney, Agent, or Firm*—Alfred M. Goodman; Mark S. Bicks; Garrett V. Davis

(57) ABSTRACT

A cable connector is provided for connecting a cable to an electrical box. The cable connector has a body with an axial passage for receiving the cable where the body has a first end and a second end. The first end of the body is connected to the electrical box by a coupling member. Two spaced apart spring arms extend from the second end of the body and are angled inwardly to engage the cable and couple the cable to the connector. In one embodiment, the spring arms extend from a top portion of the body inwardly toward the axial center of the body. The first end of the connector includes a coupling tab for coupling to the electrical box and attaching the connector to the electrical box. In one embodiment, the coupling tab is formed with the front end of the body. In a second embodiment, the coupling tab is formed with the forward end of the coupling spring.

35 Claims, 9 Drawing Sheets

U.S. PATENT DOCUMENTS

| | | |
|---|---|---|
| 7,154,054 B1 | 12/2006 | Gretz |
| 7,161,095 B1 | 1/2007 | Gretz |
| 7,205,489 B2 | 4/2007 | Auray et al. |
| 7,211,744 B2 | 5/2007 | Jorgensen |
| 7,226,309 B1 | 6/2007 | Gretz |
| 7,358,448 B2 | 4/2008 | Auray et al. |
| 7,390,979 B1 * | 6/2008 | Johnson ................ 174/655 |
| 7,432,452 B2 | 10/2008 | Gardner |
| 7,442,079 B1 | 10/2008 | Gretz |
| 7,476,817 B1 * | 1/2009 | Shemtov ................ 174/661 |
| 7,645,947 B2 * | 1/2010 | Kiely et al. ............ 174/666 |
| 2007/0163804 A1 | 7/2007 | Auray et al. |

* cited by examiner

ONE-PIECE ELECTRICAL CABLE CONNECTOR HAVING A RETAINING SPRING

FIELD OF THE INVENTION

The present invention is directed to a unitary flexible metal conduit or cable connector having a retaining spring for electrically connecting and securing an electrical flexible metal conduit or cable to an electrical box. More particularly, the invention is directed to a one piece connector with an integral retaining spring.

BACKGROUND OF THE INVENTION

Electrical wiring is connected to an electrical box which supports various electrical devices such as switches and electrical receptacles. The wiring in some environments includes a metal armor cable formed around the wiring to protect the wiring. The armor cable must then be secured to and electrically connected to the electrical box. A variety of connector devices have been produced for connecting the armor cable or conduit to the electrical box without interfering with the electrical wires. Many of the couplings have a threaded end that is inserted through an opening in the electrical box which is then secured by a locknut. A screw extends through the wall of the connector member to secure the cable to the connector.

Electrical wiring is used for connecting electrical power lines and electrical outlets in order to provide access to electrical power in residential and commercial buildings. Electrical boxes are provided in the buildings to support electrical devices and to receive portions of the electrical wiring and contain and isolate therein splices in the wiring which extends from the junction boxes to the main electrical power lines and to outlets and switches in the building. For protection of the electrical wiring, the wiring is often housed, and carried within metal conduits or metal cables. It is also desirable to connect ends of the metal conduits to the electrical junction boxes.

An example of an armored cable connector is disclosed in U.S. Pat. No. 4,990,721 to Sheehan. This device is a one-piece connector having two wings that are pivoted toward one another to grip the armored cable therebetween. The connector has snap connectors to lock the wings together around the cable. Springs extend outwardly from the wings to couple the connector to the electrical box.

Another example of an armored cable connector is disclosed in U.S. Pat. No. 6,444,907 to Kiely. The cable connector includes an outer housing with a locking ring fitted on the outer surface of a first end for coupling the connector to an electrical box and an inner sleeve. The inner sleeve has inwardly extending arm members for gripping the outer surface of the cable.

Examples of various coupling devices and connectors include a body and a separate spring clip as disclosed in U.S. Pat. No. 5,731,543, U.S. Pat. No. 6,020,557 and U.S. Pat. No. 6,034,326, which are incorporated herein by reference in their entirety. The spring clips couple the armor cable to the connector body with a spring tension when the devices are inserted into the opening in the electrical box. These devices do not enable the conduit connector to be independently and securely attached to the armored cable before installation into the electrical box.

A variety of devices have been used over the years for connecting conduits which carry electrical wires to electrical junction boxes. Representative examples of these devices are disclosed in U.S. Pat. No. 3,369,071 to Tuisku, U.S. Pat. No. 4,012,578 to Moran et al., U.S. Pat. No. 4,021,604 to Dola et al., U.S. Pat. No. 4,880,387 to Stikeleather et al., U.S. Pat. No. 5,171,164 to O'Neil et al., U.S. Pat. No. 5,204,499 to Favalora, U.S. Pat. No. 5,276,280 to Ball, U.S. Pat. No. 5,285,013 to Schnell et al., U.S. Pat. No. 5,373,106 to O'Neil et al. and U.S. Pat. No. 5,422,437 to Schnell.

The prior connector device has performed with satisfaction over the years and met the objectives it was originally designed to achieve. However, many of these devices do not enable coupling of the cable independent of assembly with the electrical box. While the above noted connectors generally satisfy the intended need, there is a continuing need in the industry for improved conduit connector devices.

SUMMARY OF THE INVENTION

The present invention is directed to a connector assembly for connecting a metal electrical cable or conduit to an electrical box. The invention is particularly directed to a connector that can be coupled securely to a cable such as an armored cable independent of coupling the connector to an electrical box.

One aspect of the invention is to provide a cable connector that can also be preassembled and secured to a predetermined length of cable prior to shipping to the user for ease of assembly with the electrical box. The preassembled connector and cable (referred to as a whip in the industry) are coupled together in a manner to resist the separation of the various components during shipping while maintaining the ease of use at the work site. The cable connector can be separated from the cable if desired by releasing the spring that engages the cable.

The present invention provides a one-piece conduit cable connector assembly for connecting a metal conduit or cable carrying electrical wires to an electrical box. The electrical box is typically used to support electrical devices such as switches and electrical outlets. The cable connector can be easily coupled to and disconnected from the electrical box.

The electrical connector of the invention is simple to manufacture and is easy to assemble and connect to the electrical cable and the electrical box. The connector assembly can be connected to a flexible metal cable or conduit such as an armored cable before transporting to the work site. The connector assembly can also be connected to the cable at the work site for connecting the cable to an electrical box. The preassembly of the connector to the conduit provides easier assembly at the work site and reduces loss of parts and eliminates the need to assemble the connector and metal cable at the work site or to feed the cable through the cable connector.

The cable connector of the invention has a body in the shape of a sleeve, where the sleeve includes spring arms that engage the cable or conduit and a spring tab that hooks to an edge of an opening in the electrical box. The spring engages the cable and attaches the cable to the sleeve and connects the assembly to the electrical box.

The cable connector assembly of the invention provides a spring integrally formed with a sleeve member and includes arms that are able to engage the outer surface of the cable to retain the cable in the axial passage of the sleeve. The spring has a distal end with a coupling hook that engages the inner surface of the electrical box.

A further aspect of the invention is to provide a metal conduit or cable connector having a spring arm integrally formed with the body which is able to engage and grip the cable and hook to the inner surface of the electrical box. The spring arm has spring legs that extend into the body of the cable connector to grip the cable. The spring arm is formed downwardly so that a coupling force will be applied to the legs and to allow the end of the spring arm to be inserted into the opening in the electrical box. The spring arm is biased upwardly to engage the edge of the opening in the electrical box while the position of the spring arm when coupled to the electrical box enables the legs to apply a downward biasing force against the cable.

The various aspects of the invention are basically attained by providing a cable connector for attaching a metal conduit or cable carrying electrical wires to an electrical junction box. An electrical connector is coupled to an electrical box which comprises a body having a first end, a second end, a bottom portion and opposite side portions defining an open top portion. The first end has a coupling member for coupling with an opening in the electrical box. A spring catch at the first end cooperates with the coupling members for coupling the body to the electrical box. The spring catch is integrally formed with the body. A cable retaining spring is integrally formed with the body and extends from the second end toward the bottom portion of the body for gripping and retaining a cable in the body.

The aspects of the invention are also attained by providing a one piece integrally formed cable connector comprising a body having a first end, a second end, a bottom portion and opposite side portions extending from the bottom portion and defining an open top. The body has a coupling member at the first end for coupling with an opening in the electrical box. A spring catch cooperates with the coupling member for coupling the body to the opening in the electrical box. A cable retaining spring has a first end extending toward the first end of the body overlying the open top and having a second end coupled to the second end of the body.

The aspects of the invention are further attained by providing a one piece, integrally formed cable connector comprising a body having a first end, a second end, a bottom portion and opposite side portions extending from the bottom portion and defining an open top. A coupling member is integrally formed with the body for coupling with an opening in the electrical box. At least one spring catch is integrally formed with one of the side portions and extends from the first end and is oriented with respect to the coupling member for coupling the body to the electrical box. A cable retaining spring is integrally formed with the second end of the body. The cable retaining spring extends toward the first end and at an incline toward the bottom portion for gripping and retaining a cable in the body.

These and other aspects of the invention will become apparent form the following detailed description of the invention which taken in conjunction with the annexed drawings discloses various embodiments of the invention.

BRIEF DESCRIPTION OF THE DRAWINGS

The following is a brief description of the drawings in which.

DETAILED DESCRIPTION OF THE INVENTION

The present invention is directed to a conduit connector and assembly for coupling a conduit or metal clad cable to an electrical box. The invention is particularly directed to a conduit and cable connector coupled to a pre-cut length of cable or whip that can be coupled directly to an electrical box where the conduit and connector can be assembled prior to coupling to the electrical box.

The cable connector of the invention provides a structure that enables the cable and the cable connector to be assembled so that the cable connector is retained on the end of the cable independent of the assembly of the cable connector to the electrical box. The cable connector enables the cable and connector to be assembled in a manner to secure the connector to the cable to simplify installation at the work site. The cable connector has a latch mechanism that secures the connector to the cable. The latch mechanism can be released so that the cable can be separated from the connector. The cable can be a conduit or corrugated armor cable as known in the art.

Figure 2:
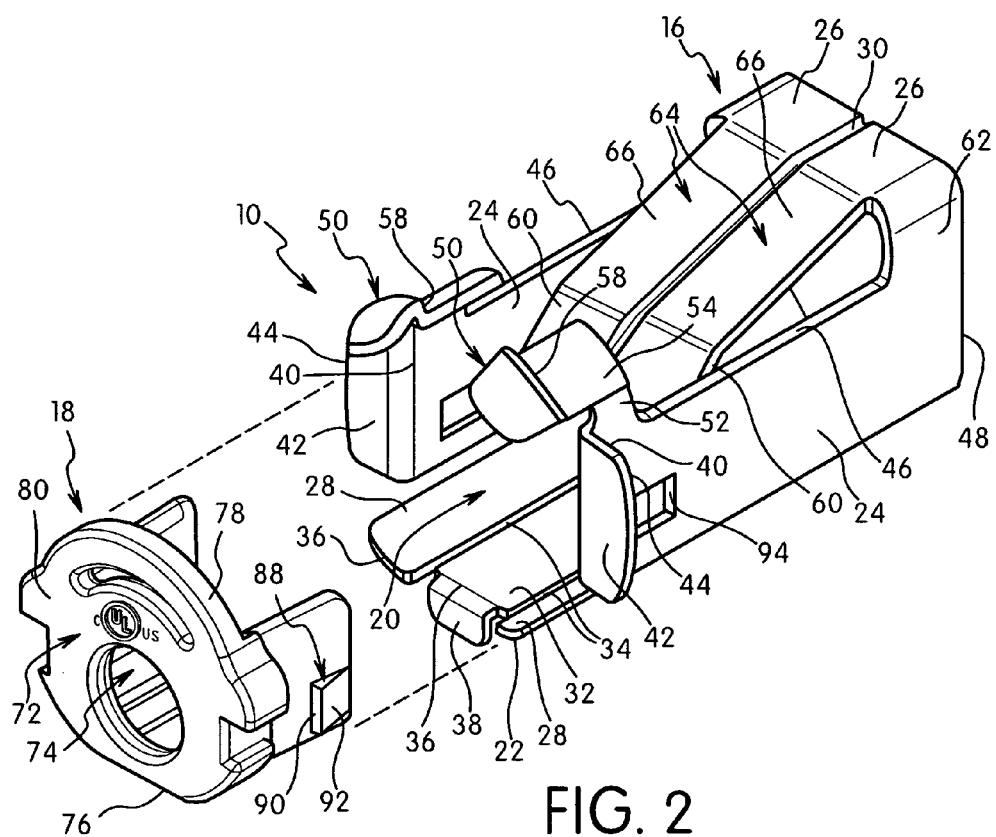
FIG. 2 is an exploded perspective view showing the cable connector and end grommet.
Figure 4:
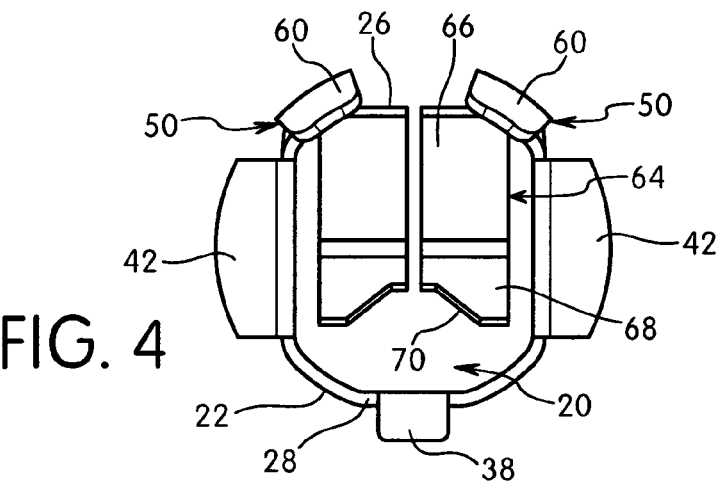
FIG. 4 is an end view of the cable connector.
Figure 5:
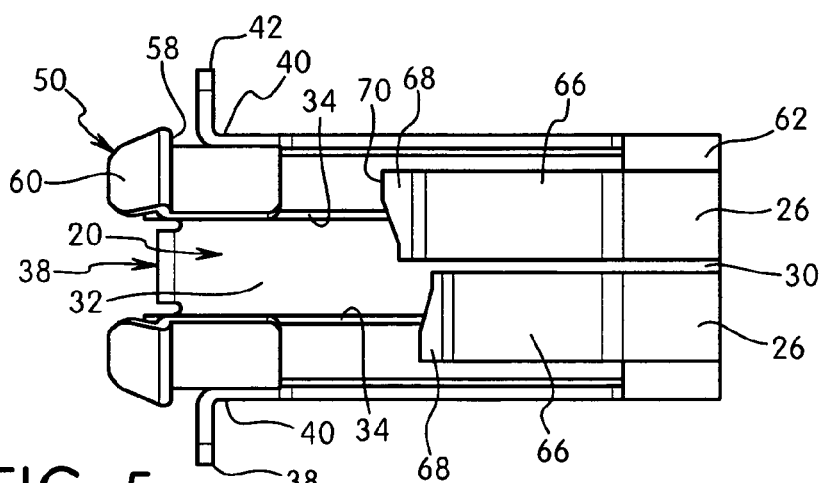
FIG. 5 is a top view of the cable connector.
Figure 6:
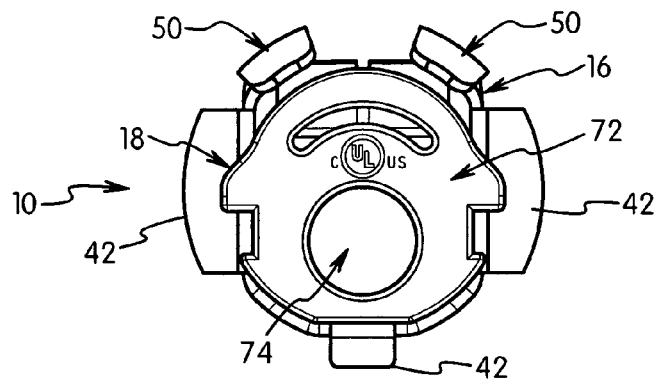
FIG. 6 is an end view of the cable connector showing the grommet positioned in the cable connector.
Figure 7:
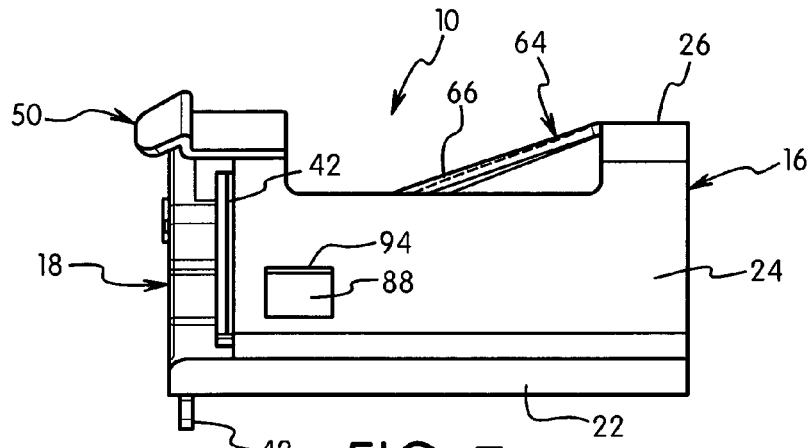
FIG. 7 is a side view of the cable connector and grommet assembly.

Referring to the drawings, the invention is directed to a cable connector 10 for receiving an electrical cable 12 and coupling the cable and connector to an electrical box 14. Cable connector 10 includes a main body 16 and a grommet 18. Main body 16 of cable connector 10 is in the form of a sleeve having an axial passage 20 as shown in FIG. 2 for receiving the end of the cable 12. The axial passage preferably extends the longitudinal length of the connector. Cable connector 10 has a bottom portion 22, opposite side portions 24, and a top portion 26. Bottom portion 22 and side portions 24 define an open top of body 16. As shown in FIG. 2, cable connector 10 is an integrally formed one piece member formed from a blank that is folded to form the main body having the axial passage 20. As shown in FIG. 2, side portions 24 are folded upwardly with respect to bottom portion 22 and each top portion 26 is folded inwardly from side portions 24. In the embodiment illustrated, the bottom portion 22 has a curved shape forming a concave inner surface 28 as shown in FIG. 4. Side portions 24 are substantially planar and parallel to each other and extend upwardly from bottom portion 22. Top portion 26 is formed by a portion coupled to the respective side portions 24 and folded inwardly to define a gap 30 between the portions defining top portion 26. Top portion 26 is substantially flat in the embodiment illustrated and perpendicular to side portions 24. Cable connector 10 has a longitudinal length sufficient to couple to electrical cable 12 and connect to electrical box 14. The outer dimension of cable connector 10 corresponds to an opening in electrical box formed by a knock-out or pry-out tab as known in the art.

Bottom portion 22 of connector 10 has a center portion 32 formed by two parallel cuts 34 extending from a first forward end 36 of bottom portion 22 and connector 10. A coupling member shown as a downwardly extending tab 38 is formed on center portion 32 which extends outwardly from connector 10 substantially perpendicular to the plane of center portion 32 and bottom portion 22. Tab 38 has a dimension to hook to an inner surface of an opening in electrical box 14 as discussed hereinafter in greater detail.

Side portions 24 have a flat planar configuration with a first end 40 having an outwardly folded tab 42. Tab 42 is substantially parallel to tab 38 and is spaced from tab 38 a distance corresponding substantially to the thickness of a side wall of electrical box 14. Tab 42 as shown is integrally formed with the respective side portion 24 and has an outer edge 44 spaced from side portion 24. Tab 42 has a dimension to extend outwardly a distance greater than the dimension of the opening of electrical box 14.

Figure 3:
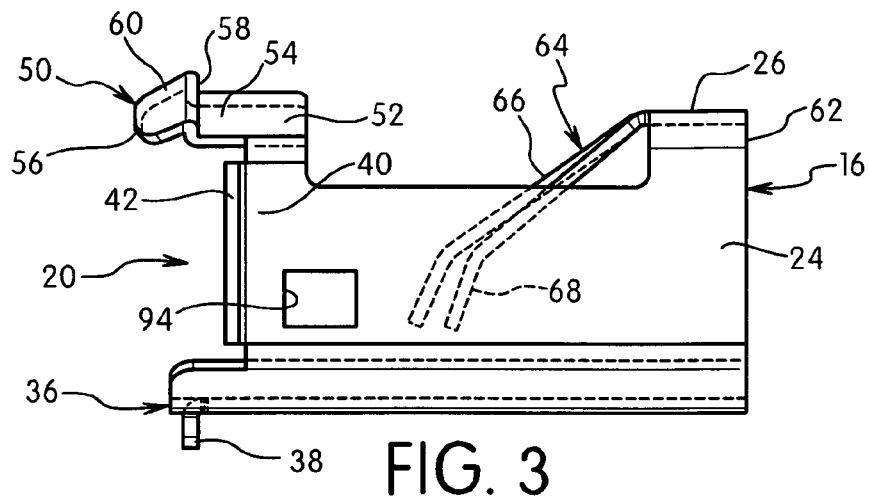
FIG. 3 is a side view of the cable connector of FIG. 1.

Side portions 24 have a top edge 46 extending from first end 40 to a second end 48. As shown in FIG. 2, a spring catch in the form of a coupling tab 50 is provided at first end 40 of side portion 24. Referring to FIG. 3, coupling tab 50 includes a body 52 and a leg 54 extending forward from body 52 towards first end 36 of cable connector 10. In the embodiment illustrated, leg 54 and body 52 have a curved shape corresponding to the curvature of bottom portion 22 and corresponding substantially to the curvature and dimensions of the opening in electrical box 14. Legs 54 are curved to overlie bottom portion 22 and extend forward past the tabs 42 to a forward end 56. Coupling tabs 50 include a hook portion 58 in the form of a ledge and an inclined portion 60 extending to forward end 56. Inclined portion 60 is inclined toward the axial center of cable connector 10 to guide coupling tab 50 through the opening in the electrical box. Hook portion 58 extends outwardly and is substantially parallel to tab 42. Leg 54 is formed from spring steel and is sufficiently flexible for coupling with an electrical box and providing an outwardly biasing force for engaging the opening in electrical box 14. In one embodiment, a coupling tab 50 is provided on each side wall. In other embodiments, a single coupling member can be provided or more than two coupling members can be provided.

Second end 48 of top edge 46 of cable connector 10 includes a connecting portion 62 for coupling the respective top portion 26 to side portion 24. A spring arm 64 extends from each respective top portion 26 as shown in FIGS. 2-5. The spring arms 64 and the respective top portion 26 define a cable retaining spring. The top portion 26 forms a base for the respective spring arm 64. Spring arms 64 are positioned beside each other and extend from the respective top portion at an incline in a generally forward direction toward first end 36 and toward bottom portion 22. As shown in FIG. 3, spring arms 64 are oriented at an angle of about 45° relative to the longitudinal axis of cable connector 10. Spring arms 64 are preferably biased in a downward direction toward bottom portion 22. Spring arms 64 include a leg 66 and an angled end tab 68 terminating in a gripping end 70. Each spring arm 64 can have substantially the same length for gripping the outer surface of electrical cable 12. As shown in FIG. 3, spring arm 64 can be staggered at slightly different angles for gripping the spiraled surface of the armor cable of electrical cable 12.

Figure 1:
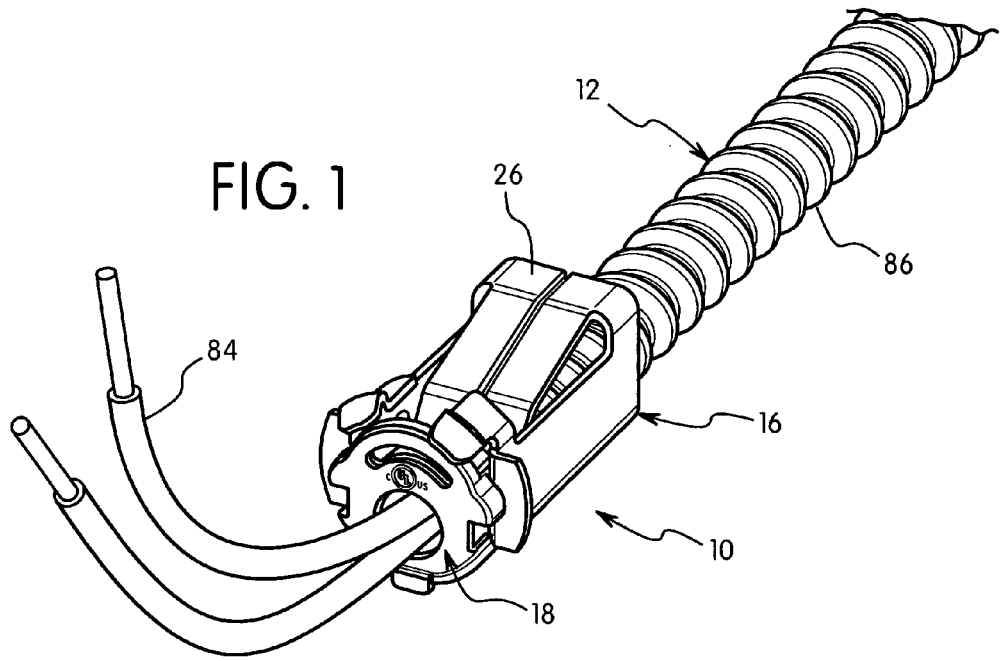
FIG. 1 is perspective view of the connector assembly in one embodiment of the invention.

Grommet 18 is inserted into first end 36 of connector 10 as shown in FIGS. 1 and 2. Grommet 18 has a substantially cylindrical shape with a body 72 which forms a sleeve having an axial passage 74 for receiving electrical wires from electrical cable 12. Grommet 18 has a first end 76 with a collar 78 extending outwardly in a generally radial direction. Collar 78 has an outer face 80 and an inner face 82. Collar 78 has a radial dimension sufficient to engage the end of electrical cable 12 and to protect wires 84 from contacting the end of the armor sheath 86 of cable 12 to prevent damage to the wires during use. Grommet 18 is generally formed from a molded rigid plastic material as a one piece member.

Body 72 of grommet 18 includes locking tabs 88 integrally formed therein and extending in an outward direction with respect to grommet 18 toward side portions 24. Locking tabs 88 have a straight forward face 90 facing the first end and being parallel to collar 78 at an inclined surface 92 for inserting grommet 18 into the open end of connector 10. Locking tabs 88 are aligned with corresponding openings 94 inside portions 24 for coupling grommet 18 to connector 10.

Figure 8:
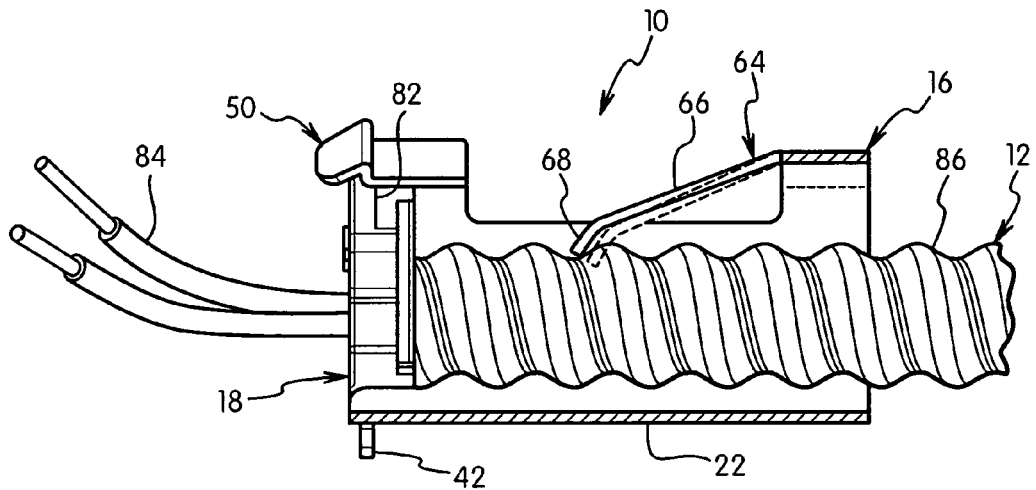
FIG. 8 is a cross-sectional view of the cable connector and cable.
Figure 9:
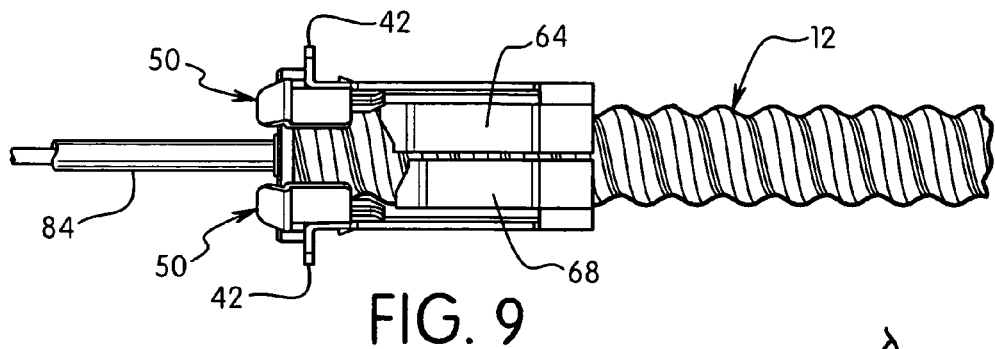
FIG. 9 is a top view of the cable connector and the cable of FIG. 8.
Figure 10:
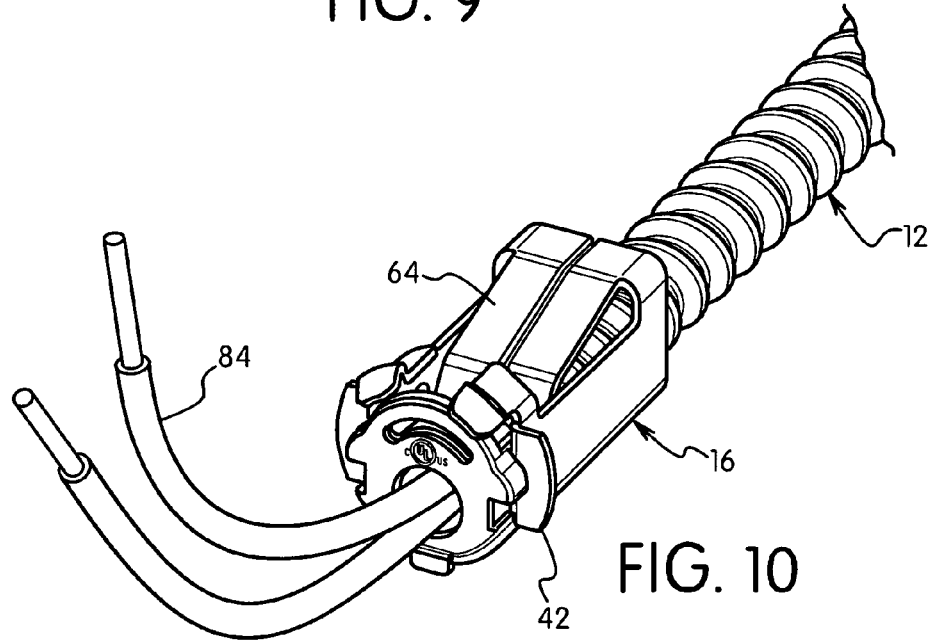
FIG. 10 is a perspective view of the cable connector and cable.

Electrical cable 12 is coupled to cable connector 10 by feeding wires 84 from second end 48 through the axial passage 20 of cable connector 10 and through the axial passage 74 of grommet 18. Cable 12 is passed through the axial passage so that spring arms 64 engage the outer surface of armored sheath 86 as shown in FIGS. 8, 9 and 10. Spring arms 64 are spring biased in a downward direction to engage the corrugations of armored sheath 86 and resist separation of cable 12 from cable connector 10. A suitable tool can be inserted into cable connector 10 to lift and separate spring arms 64 from cable 12 so that cable 12 can be separated from cable connector 10.

Figure 11:
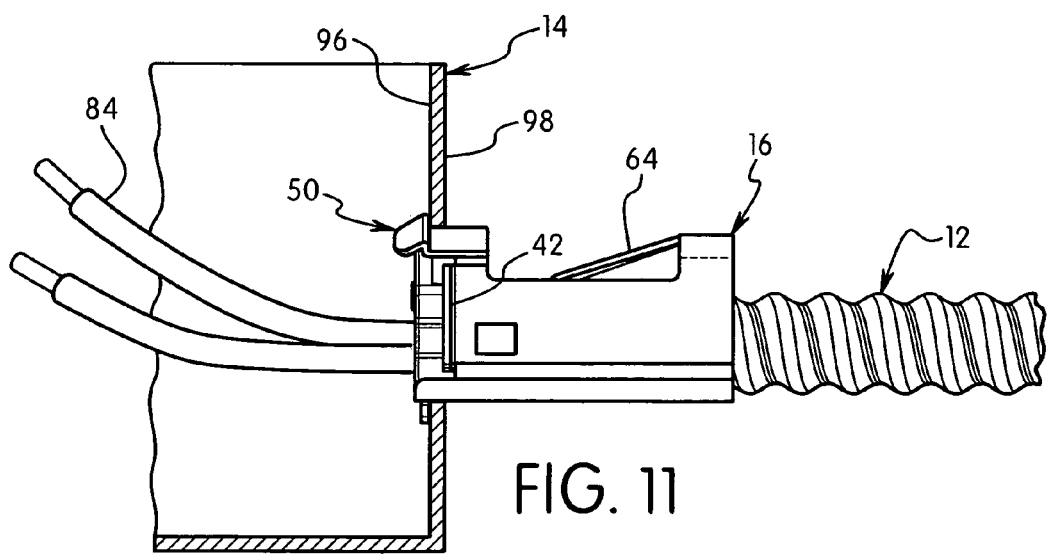
FIG. 11 is a side view showing the cable connector coupled to an electrical box.
Figure 12:
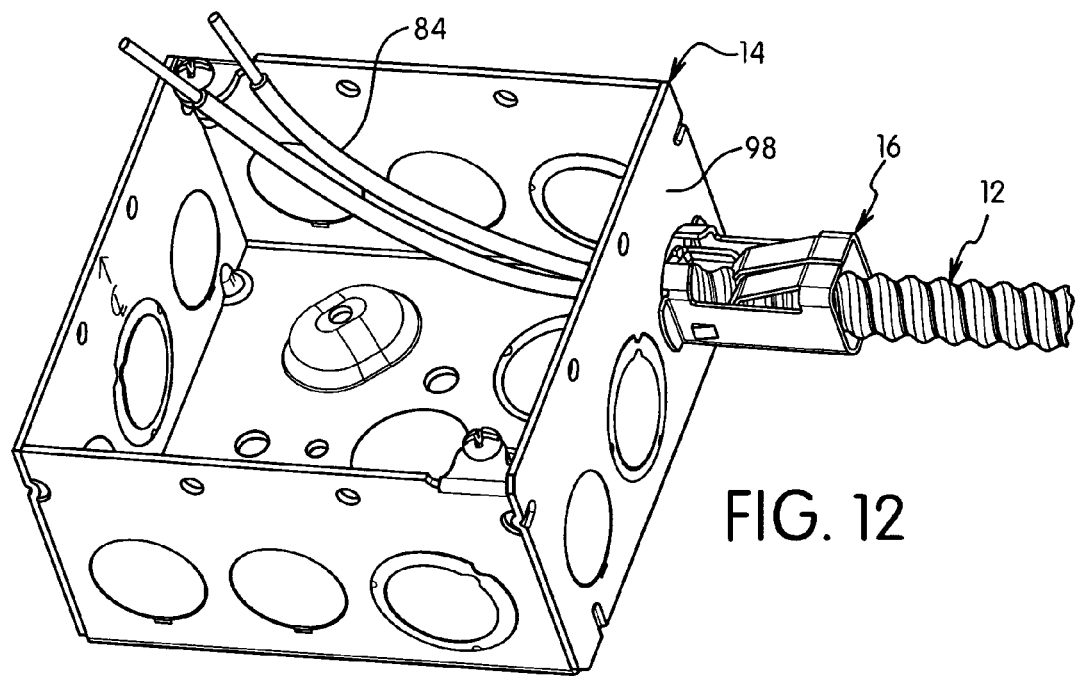
FIG. 12 is a perspective view of the cable connector and inner side of the electrical box.
Figure 13:
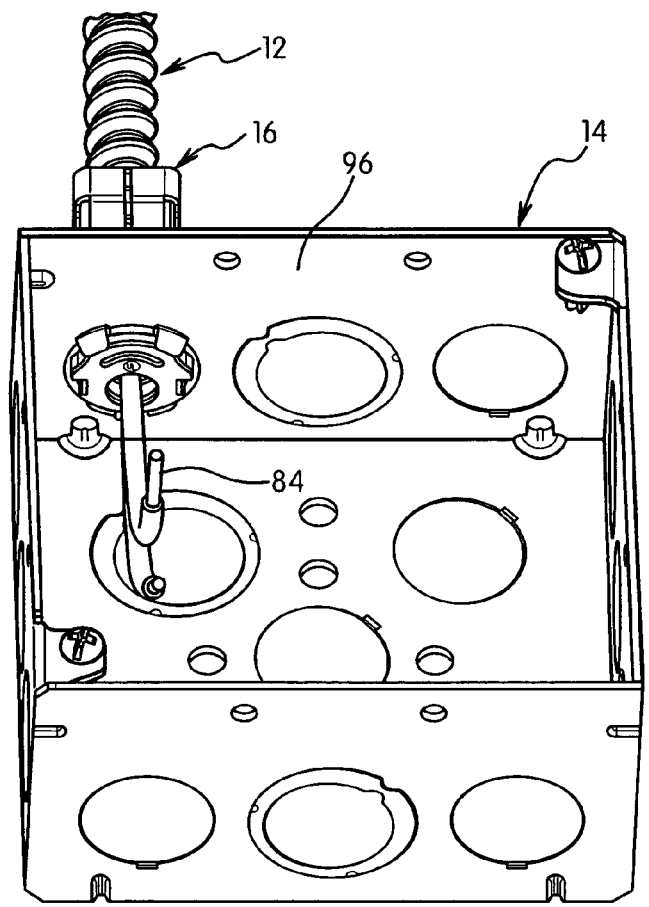
FIG. 13 is a perspective view of the cable connector and inner side of the electrical box.

Cable connector 10 and the electrical cable 12 are then attached to electrical box 14 as shown in FIGS. 11-13. Cable connector 10 is inserted into a circular opening provided in electrical box 14 by inserting tab 38 through the opening in electrical box 14 to hook to the inner surface 96 of electrical box 14. Cable connector 10 is then rotated so that tabs 38 contact the outer surface 98 of electrical box 14 and coupling tabs 50 slide through the opening and snap into position to engage the opening and retain cable connector 10 coupled to electrical box 14 as shown in FIG. 11. Wires 84 are then connected to the electrical device mounted within electrical box 14.

Cable connector 10 can be removed from the electrical box by depressing the coupling tabs 50 to release the hook portions 58 from the opening in electrical box 14 and pivoting cable connector 10 outwardly. If necessary, cable 12 can be separated from the cable connector by lifting upwardly on spring arms 64 to release the spring arms 64 from the armored sheath 86.

Embodiment of FIGS. 14-24

Figure 20:
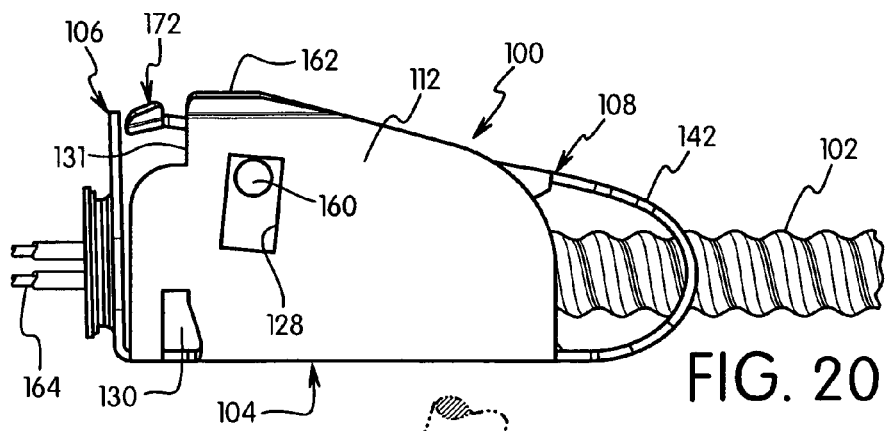
FIG. 20 is a side view of the cable connector of FIG. 19.
Figure 21:
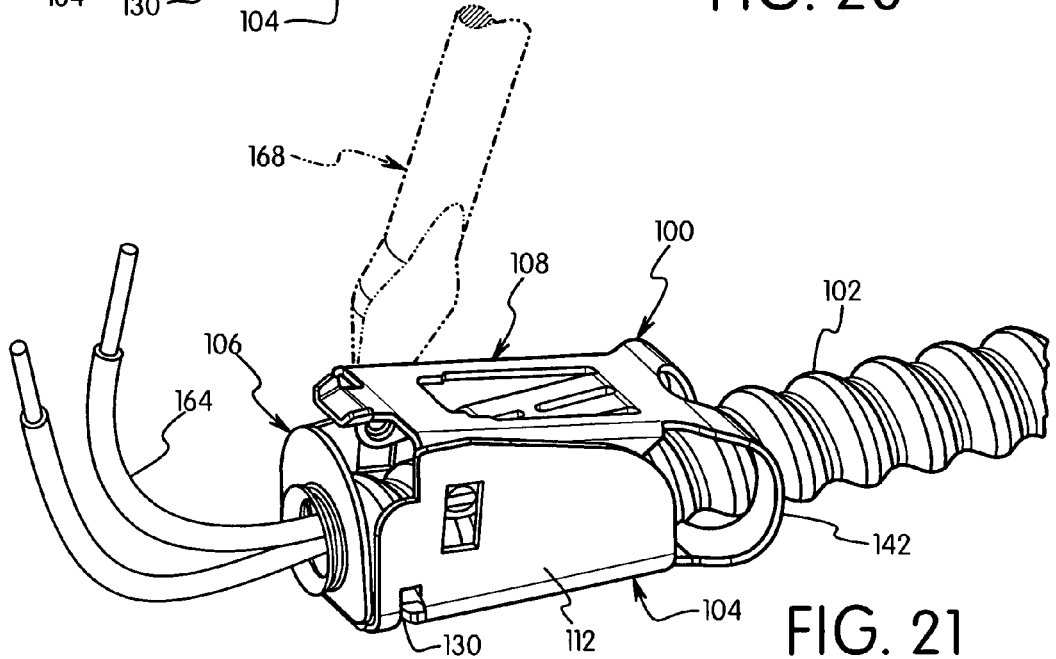
FIG. 21 is a perspective view of the cable connector of FIG. 14 showing the removal of the connector from a cable.
Figure 22:
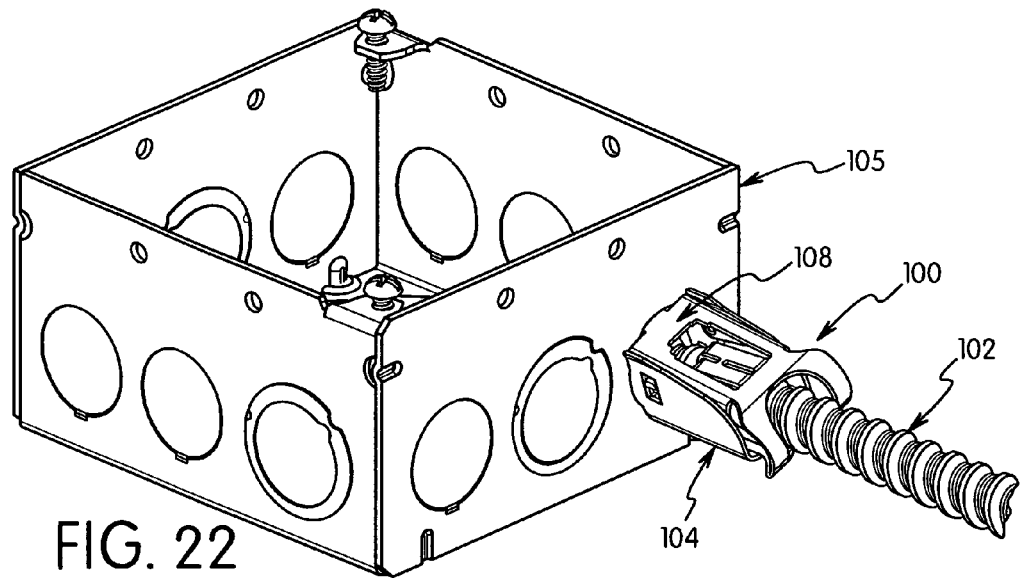
FIG. 22 is a perspective view of the cable connector coupled to an electrical box.
Figure 23:
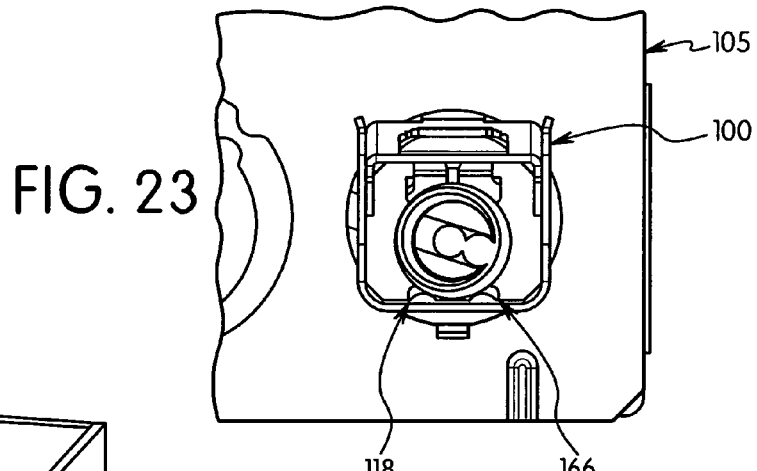
FIG. 23 is an end view of the cable connector and electrical box.
Figure 24:
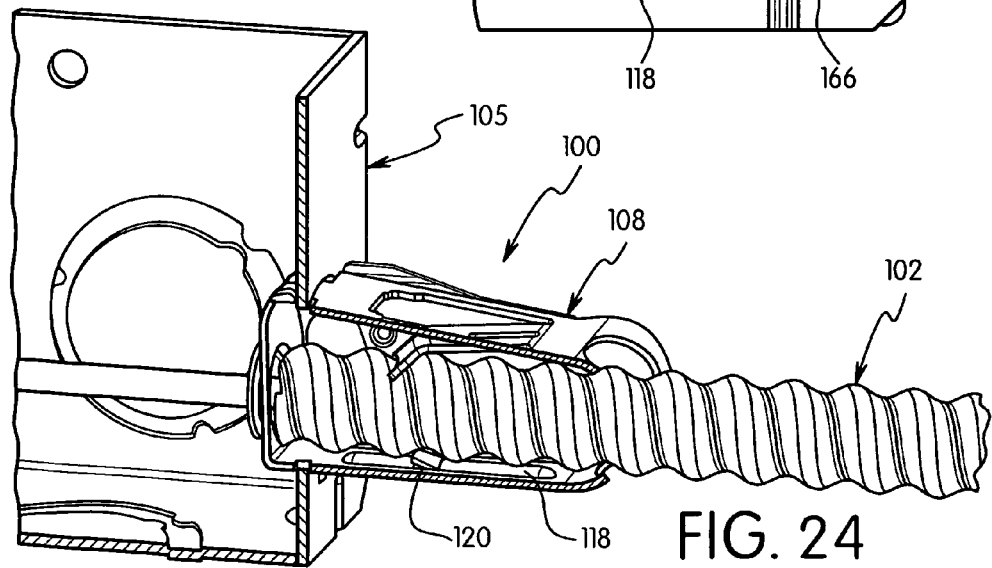
FIG. 24 is a cross-sectional side view of the cable connector and electrical box.

A second embodiment of the invention is shown in FIGS. 14-24 includes cable connector 100 and cable 102. Cable connector 100 is operated in a similar manner to the previous embodiment for coupling to cable 102 and coupling cable 102 to an electrical box 105 as shown in FIGS. 22-24.

Connector 100 is an integrally formed one piece member having a body 104, an end wall 106 and a cable retaining spring in the form of a coupling spring 108. Body 105 includes a bottom wall 110 and opposite side walls 112. Connector 100 can be made from a single piece of spring steel that is folded to the desired shape.

Figure 17:
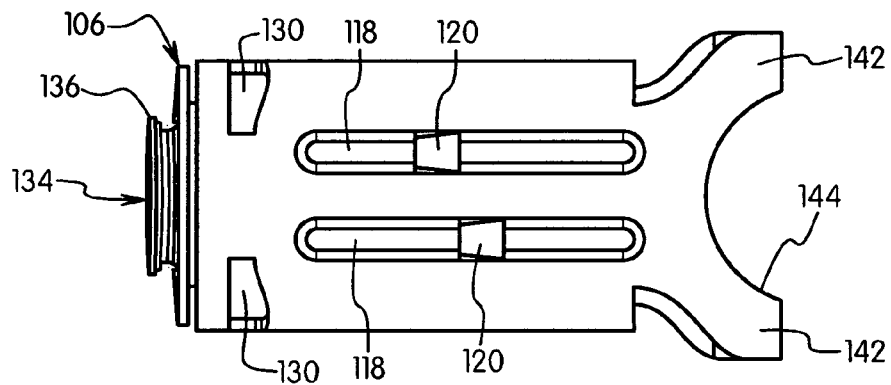
FIG. 17 is a bottom view of the cable connector of FIG. 14.
Figure 18:
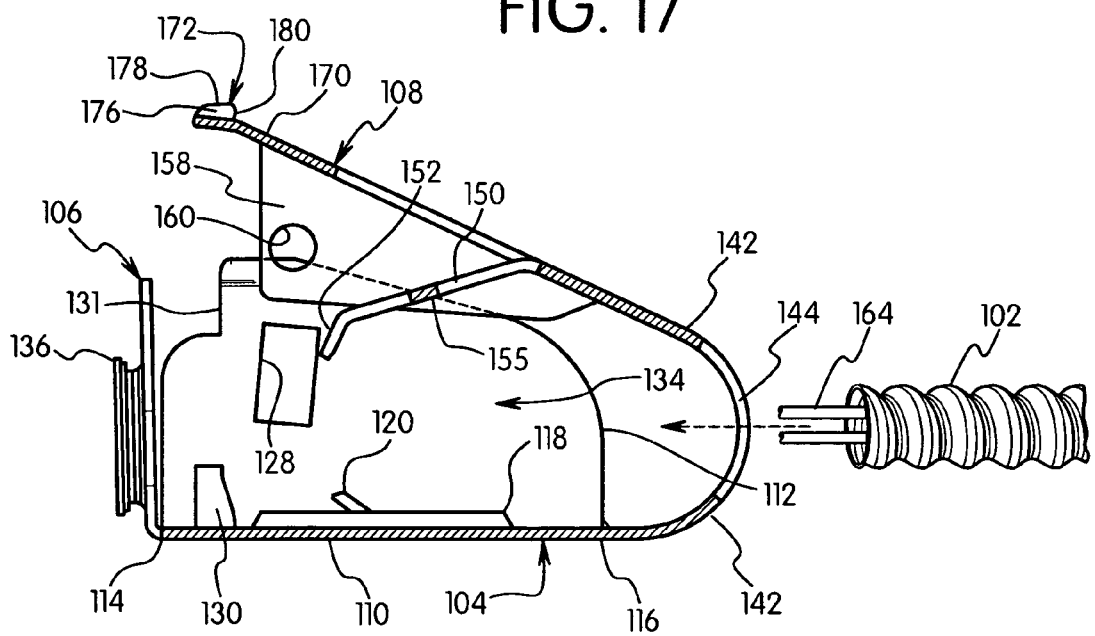
FIG. 18 is a side cross-sectional view of the cable connector of FIG. 14.

Bottom wall 110 has a substantially flat planar configuration with a first end 114 and a second end 116 defining a longitudinal dimension of connector 100. As shown in FIGS. 17 and 18, bottom wall 110 includes two spaced apart, embossed ribs 118 extending inwardly with respect to bottom wall 110. Ribs 118 are spaced apart and have a dimension for supporting the electrical cable within the axial passage of connector 100. In one embodiment of the invention, an inwardly extending tab 120 is cut from each rib 118 and extends upwardly to engage the surface of the cable. Typically, tabs 120 are angled in a forward direction toward first end 114 to resist removal of the cable from connector 100.

Figure 14:
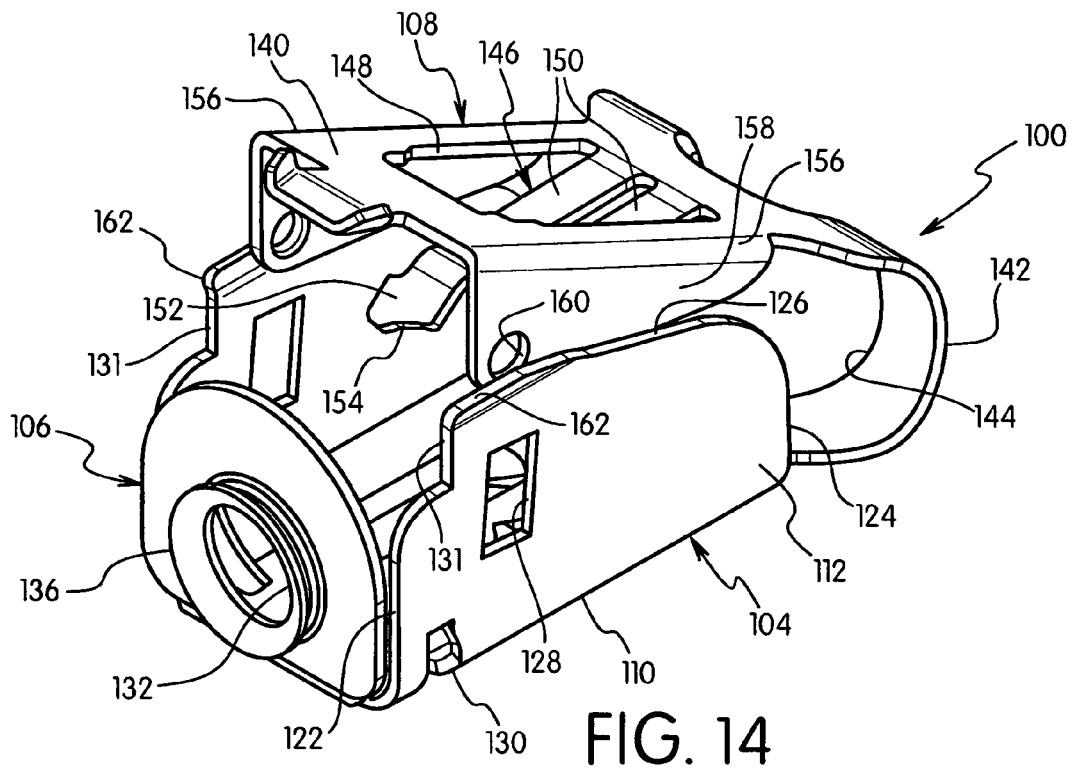
FIG. 14 is a perspective view of a second embodiment of the cable connector.

Side walls 112 extend parallel to each other and extend upwardly from bottom wall 110 in a direction substantially perpendicular to bottom wall 110. Side walls 112 have a first end 122 and a second end 124 and a top edge 126. As shown in FIG. 14, side walls 112 have a cut-out 128 defining an opening in side wall 112. A notch 130 in the form of a slot in each lower corner extends between bottom wall 110 and each side wall 112. Notch 130 has a dimension to receive the side wall of the electrical box when connector 100 is coupled to the electrical box. In the embodiment shown, bottom wall 110 and side walls 112 are substantially flat to define a substantially square cross sectional shape. Body 104 has an outer dimension such that body will not pass completely through the opening in the electrical box. A front edge portion 131 of side walls 112 are aligned with the notches 130 to contact the outer surface of the electrical box when connector 100 is coupled to the electrical box as shown in FIG. 22.

Figure 15:
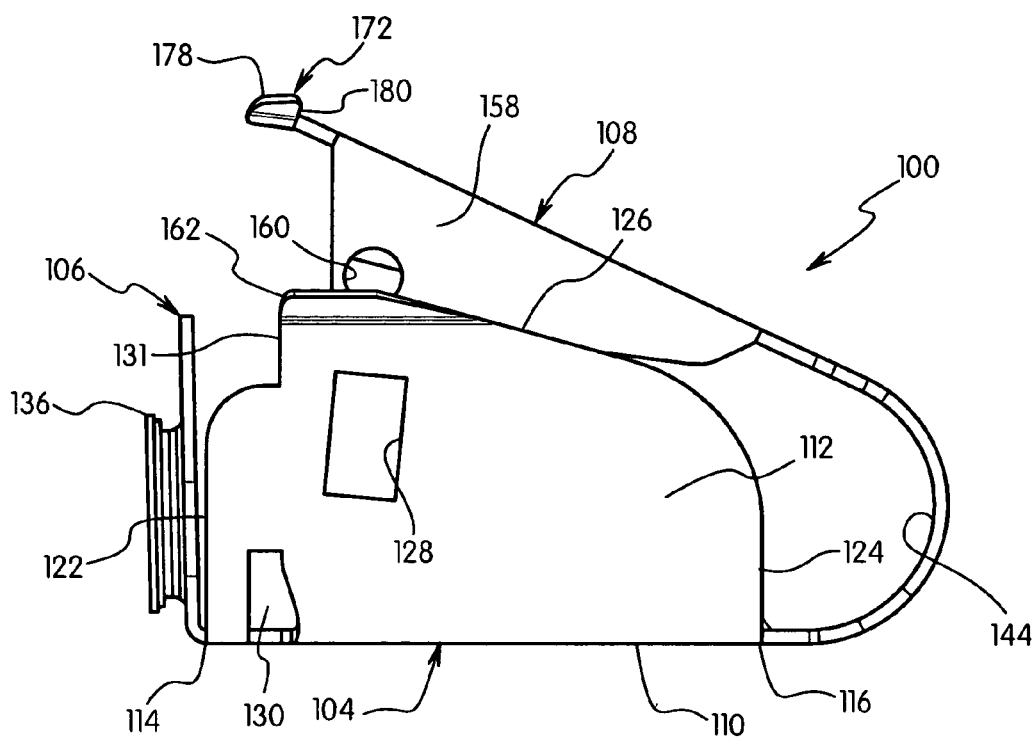
FIG. 15 is a side view of the cable connector of FIG. 14.
Figure 16:
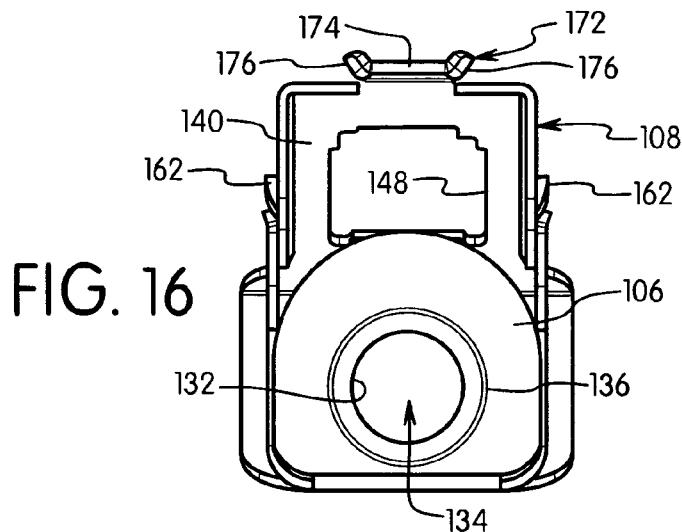
FIG. 16 is an end view of the cable connector of FIG. 14.

End wall 106 is coupled to bottom wall 110 and extends upwardly perpendicular to bottom wall 110. End wall 106 is provided at the first end 114 of bottom wall 110 and is oriented substantially perpendicular to side walls 112. End wall 106 has a central axial opening 132 aligned with the axial center defining an axial passage 134 extending through connector 100. As shown in FIGS. 14 and 15, opening 132 in end wall 106 is formed with an outwardly flared flange 136 to provide a smooth, rounded surface to prevent damaging the wires passing through the opening 132 and axial passage 134. In one embodiment of the invention, end wall 106 is punched and pressed around opening 132 and rolled over to form the flared flange 136. Alternatively, flange 136 can be a separate component that is inserted through opening 132 and stamped or crimped to couple to end wall 106.

Coupling spring 108 is connected to the second end of body 104. In the embodiment illustrated, coupling spring 108 includes a body 140 and a pair of legs 142 forming a spring portion extending between body 140 and second end 116 of bottom wall 110. As shown in FIG. 17, legs 142 are spaced apart to form an opening 144 aligned with the axial passage 134. Legs 142 have a substantially U-shape in the embodiment shown to bias coupling spring 108 in a direction away from bottom wall 110.

Body 140 of coupling spring 108 has two spaced apart spring arms 146 cut from body 140 to define an opening 148 in body 140. Spring arms 146 include a leg 150 extending at an incline with respect to body 140. Each leg 150 has an angled tab that is inclined with respect to the plane of leg 150 for engaging the outer surface of the electrical cable. As shown in FIG. 14, the ends of angled tab 152 have a curved edge 154 for contacting the outer surface of the electrical cable. In the embodiment illustrated, legs 150 of spring arms 146 are connected together at a mid point by a connecting tab 155. In other embodiments, legs 150 can be separate and able to operate independently.

Body 140 includes opposite side edges 156 with downwardly extending side members 158. Side members 158 in the embodiment illustrated have a substantially triangular configuration with an embossed dimple 160 extending outwardly. Side members 158 are oriented to slide along the inner surface of side walls 112. As shown in FIG. 14, the top edge 126 of each side wall 112 is provided with an angled flange 162 to engage the respective dimple to cause the dimple to slide along the inner surface of the respective side wall 112. Each dimple 160 is aligned with the opening 128 in side wall 112.

Body 140 of coupling spring 108 is spring biased by legs 142 in a direction substantially upward with respect to connector 100 in bottom wall 110 to the position shown in FIG. 14. An electrical cable is passed through the axial passage 134 and the opening 144 between the spring legs 142 so that wires 164 can pass through the opening 132 in end wall 106. Body 140 of coupling spring 108 is manually pressed downward against the spring biasing force of legs 142 so that spring arms 146 engage the outer surface of the armor 166 of the electrical cable and to press the electrical cable against the tabs 120 to couple the electrical cable to connector 100. Body 140 is pressed downwardly so that the dimples 160 slide along the inner surface of the respective side walls 120 and snap into the respective opening 128 in the respective side wall. Dimples 160 are received in the opening 128 forming a latching mechanism to retain coupling spring 108 in the locked engaging position as shown in FIGS. 19 and 20.

The electrical cable can be preassembled with connector 100 by passing the wires and cable through the axial passage and depressing the coupling spring 108 into the locked position to capture the cable. The cable and connector can be preassembled and shipped to the work site or can be preassembled by the installer prior to connecting to the electrical box 105. Where it is desirable to separate the cable from the connector, a tool, such as a screwdriver 168, can be inserted between body 140 and the respective side wall 112 to pry the side wall outwardly a sufficient distance to release dimple 160 from the opening 128 as shown in FIG. 21. The biasing force of the spring 108 urges the spring upwardly. A new cable can then be passed through the axial passage and coupled to the connector 100 such that the connector can be reused as desired.

Figure 19:
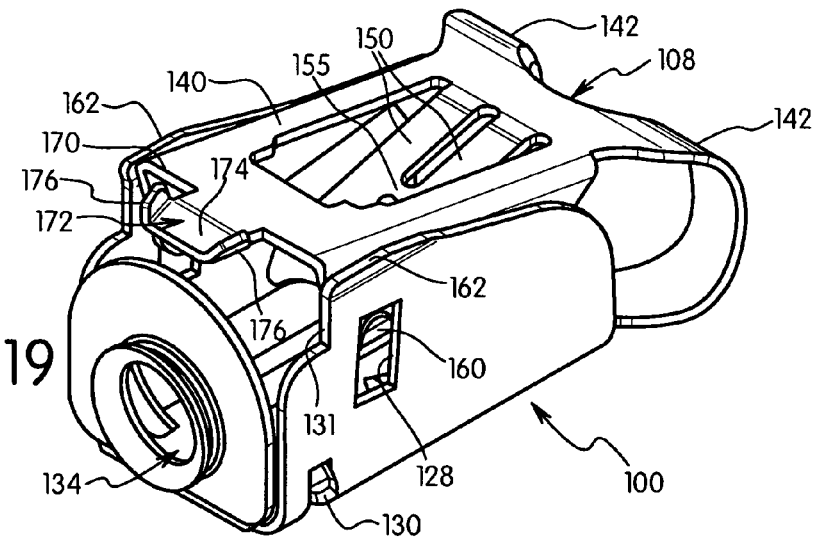
FIG. 19 is a perspective view of the cable connector of FIG. 14 showing the cable connector in the closed position.

Body 140 has an outer end 170 with a coupling tab 172 extending from outer end 170 as shown in FIG. 19. Coupling tab 172 has a body portion 174 angled slightly downwardly from the plane of body 140 and upturned outer side tabs 176. Tabs 176 have an angled front edge 178 and a straight rear edge 180 forming a hook for coupling with the inner edge of an opening in an electrical box as shown in FIG. 18. Angled front edge 178 provides a guide surface for inserting coupling tab 172 through the opening in the electrical box.

The electrical cable is assembled with the connector 100 and coupling spring 108 is snapped into the locking position. The front end of connector 100 is then inserted into an opening in electrical box 105 so that the inner edges of the opening are received in the notches 130 as shown in FIG. 23. The connector is then pivoted upwardly so that coupling tab 172 passes through the opening in electrical box 105 and hooks to the inner surface of the side wall of the electrical box 105 to connect the connector 100 to the electrical box as shown in FIGS. 22 and 24.

While various embodiments have been chosen to illustrate the invention, it will be understood by those skilled in the art that various changes and modifications can be made without departing from the scope of the invention as defined in the appended claims.

What is claimed is:

1. An electrical connector for coupling to an electrical box, comprising:
   a body having an axial dimension with a first end, a second end, a bottom portion and opposite side portions, said side portions having a top edge defining an open top portion of said body, said first end having a coupling member for coupling with an inner surface of an opening in the electrical box, said side portions having an outwardly extending tab axially spaced from said coupling member for engaging an outer surface of said opening;
   a spring catch at said first end cooperating with said coupling member for coupling said body to the electrical box, said spring catch being integrally formed with said body and extending axially outward from said first end; and
   a cable retaining spring integrally formed with said body as a one-piece unit and extending from said second end and toward said bottom portion of said body for gripping and retaining a cable in said body.

2. The electrical connector of claim 1, wherein said cable retaining spring comprises a spring arm coupled to a side portion of said body and said spring arm extending toward said bottom portion at an incline.

3. The electrical connector of claim 1, wherein said cable retaining spring comprises a first spring arm having a first end extending toward said first end of said body and a second end coupled to a first side portion at said second end of said body and a second spring arm having a first end extending toward said first end of said body and a second end coupled to a second side portion of said body.

4. The cable connector of claim 1, wherein said cable retaining spring is coupled to one of said side portions at said second end of said body, said cable retaining spring having a spring arm extending toward said first end and at an incline toward said bottom portion, said spring arm having a distal end for engaging the cable.

5. The cable connector of claim 1, wherein said cable retaining spring comprises
   a first spring arm coupled to one of said side portions at said second end of said body and having a first end extending toward said first end of said bottom portion; and
   a second spring arm coupled to the other of said side portions at said second end of said body and having a first end extending toward said first end of said bottom portion.

6. The cable connector of claim 1, wherein said spring catch comprises
   a first spring tab coupled to one of said side portions and overlying the open top; and
   a second spring tab coupled to the other of said side portions and extending substantially adjacent and parallel to said first spring tab;
   each of said first and second spring tabs having a distal end with a catch for coupling with the opening in the electrical box.

7. The cable connector of claim 6, wherein said coupling member comprises a first coupling tab for hooking to an inside edge of the opening in the electrical box and at least one second coupling tab on a side portion for contacting an outer surface of the opening in the electrical box.

8. An electrical connector for coupling to an electrical box, comprising:
   a body having a first end, a second end, a bottom portion and opposite side portions defining an open top portion, said first end having a coupling member for coupling with an opening in the electrical box;
   a spring catch at said first end cooperating with said coupling member for coupling said body to the electrical box, said spring catch being integrally formed with said body; and
   a cable retaining spring having a first end extending toward said first end of said body and a second end, said cable retaining spring being integrally formed with said body as a one-piece unit and extending from said second end of said body and toward said bottom portion of said body for gripping and retaining a cable in said body;
   said second end of said cable retaining spring including a spring portion having a first end coupled to said bottom portion of said body and a leg biasing said cable retaining spring upward from said bottom portion.

9. The electrical connector of claim 8, wherein said spring portion has two legs forming an aperture therebetween with a dimension to enable a cable to pass through.

10. The electrical connector of claim 8, wherein said cable retaining spring has a pair of spring arms extending from said second end of said retaining spring toward said bottom portion for gripping and retaining the cable and wherein said spring catch extends from said second end of said cable retaining spring.

11. The electrical connector of claim 8, wherein said cable retaining spring is spring biased away from said bottom portion, and includes a first side flange extending from a first side edge and having a first coupling member and a second side flange extending from a second side edge of said cable retaining spring and having a second coupling member, and
   said side portions having a coupling member for mating with a coupling member of a respective side flange of said cable retaining spring.

12. The electrical connector of claim 8, wherein said bottom portion has two spaced apart raised ridges for supporting the cable.

13. The electrical connector of claim 8, further comprising two spaced apart tabs extending upwardly from said bottom portion for engaging the cable.

14. The electrical connector of claim 8, wherein said body includes at least one slot at said first end defining said coupling member for coupling with an opening in the electrical box.

15. The electrical connector of claim 8, wherein said body includes a first slot extending between said bottom portion and one of said side portions, and a second slot extending between said bottom portion and the other of said side portions, said first and second slots defining said coupling member for coupling with an opening in the electrical box.

16. The electrical connector of claim 8, further comprising a front portion at said first end of said body, said front portion having an aperture for receiving electrical wires and where said aperture has a flared, curved edge.

17. The electrical connector of claim 16, wherein said flared edge is defined by a flared grommet inserted in said aperture of said front portion.

18. A one piece integrally formed cable connector comprising:
   a body having a first end, a second end, a bottom portion and opposite side portions extending from said bottom portion and defining an open top, said body having a coupling member at said first end for coupling with an opening in the electrical box;

a cable retaining spring coupled to said body having a first end extending toward said first end of said body overlying said open top and having a second end coupled to said second end of said body, said cable retaining spring being biased away from said bottom portion; and a spring catch extending from said cable retaining spring for cooperating with said coupling member for coupling said body to the opening in the electrical box.

19. The cable connector of claim 18, further comprising a front portion at said first end and having an axial opening for receiving electrical wires from the cable.

20. The cable connector of claim 18, wherein said body includes a first slot extending between said bottom portion and one of said side portions and a second slot extending between said bottom portion and the other of said side portions, said first and second slots defining said coupling member of said body.

21. The cable connector of claim 18, wherein said cable retaining spring comprises a spring body having a first free end and second end, said spring body having at least one spring arm coupled to said second end and extending toward said bottom portion at an incline for engaging the cable; and a spring member extending between said second end of said spring body and said second end of said body to bias said spring body in an upward direction away from said bottom portion.

22. The cable connector of claim 21, wherein said cable retaining spring further comprises a first side flange extending from a first side edge of said spring body and having a coupling member for coupling with one of said side portion of said body; and a second side flange extending from a second side edge of said spring body and having a coupling member for coupling with the other of said side portions of said body.

23. The cable connector of claim 21, wherein said spring member has a substantially U-shape and is coupled to said bottom portion.

24. The cable connector of claim 23, wherein said spring member includes an aperture having a dimension to receive the cable.

25. A one piece, integrally formed cable connector comprising:

a body having a first end, a second end, a bottom portion and opposite side portions extending from said bottom portion and defining an open top, a coupling member at said first end and integrally formed with said body for coupling with an opening in the electrical box;

at least one spring catch integrally formed with one of said side portions and extending axially outward from said first end and oriented with respect to said coupling member for coupling said body to said electrical box; and a cable retaining spring integrally formed with said second end of said body, said cable retaining spring extending toward said first end and at an incline toward said bottom portion for gripping and retaining a cable in said body.

26. The cable connector of claim 25, wherein said at least one spring catch has a first end coupled to said respective side portion and a distal end extending from said first end of said body and being spring biased in a radially outward direction with respect to a central axis of said body.

27. The cable connector of claim 25, wherein said cable retaining spring comprises a first spring arm coupled to one of said side portions at said second end and a second spring arm coupled to the other of said side portions, each of said spring arms extending at an incline with respect to said bottom portion and being spring biased toward said bottom portion.

28. The cable connector of claim 25, further comprising a first spring catch integrally formed with a side portion and extending axially outwardly from said first end; and a second spring catch integrally formed with a second side portion and extending axially outwardly from said first end, said first and second spring catches being spaced apart.

29. The cable connector of claim 28, wherein said coupling member comprises a tab extending radially outward from said first end.

30. The cable connector of claim 28, wherein each of said spring catches have a hook portion for engaging the electrical box and an inclined portion extending axially outward from said hook portions and said first end.

31. An electrical connector for coupling to an electrical box, comprising:

a body having a first end, a second end, a bottom portion and opposite side portions defining an open top portion, said first end having a coupling member for coupling with an opening in the electrical box;

a spring catch at said first end cooperating with said coupling member for coupling said body to the electrical box, said spring catch being integrally formed with said body; and a cable retaining spring integrally formed with said body as a one-piece unit and extending from said second end and toward said bottom portion of said body for gripping and retaining a cable in said body, said cable retaining spring being spring biased away from said bottom portion, said cable retaining spring having a coupling member for coupling with said body for retaining said cable retaining spring under tension and in a cable retaining position.

32. The electrical connector of claim 31, wherein said cable retaining spring includes at least one spring arm extending toward said bottom portion at an incline.

33. The electrical connector of claim 31, wherein said cable retaining spring includes a first side flange extending from a first side edge and having a first coupling member for coupling with a first side portion, and a second side flange extending from a second side edge and having a second coupling member for coupling with a second side portion.

34. An electrical connector for coupling to an electrical box, comprising:

a body having a first end, a second end, a bottom portion and opposite side portions defining an open top portion, said first end having an open portion defining a slot in said body for coupling with an opening in the electrical box;

a spring catch at said first end cooperating with said coupling member for coupling said body to the electrical box, said spring catch being integrally formed with said body; and a cable retaining spring integrally formed with said body as a one-piece unit and extending from said second end and toward said bottom portion of said body for gripping and retaining a cable in said body.

35. The electrical connector of claim 34, wherein said open portion is defined by a first slot extending between said bottom portion and one of said side portions, and a second slot extending between said bottom portion and the other of said side portions, said first and second slots defining a coupling member for coupling with the opening in the electrical box.

* * * * *